United States Patent [19]

Hauenstein et al.

[11] Patent Number: 5,708,085
[45] Date of Patent: Jan. 13, 1998

[54] LOW DENSITY POLYETHYLENE MODIFIED WITH SILICONE MATERIALS

[75] Inventors: Dale Earl Hauenstein; Caibao Qian; David Joseph Romenesko, all of Midland, Mich.

[73] Assignee: Dow Corning Corporation, Midland, Mich.

[21] Appl. No.: 703,161

[22] Filed: Aug. 28, 1996

[51] Int. Cl.$^6$ .................................................. C08L 83/04
[52] U.S. Cl. ........................... 525/106; 524/269; 524/264
[58] Field of Search ........................ 525/106; 524/269, 524/265

[56] References Cited

U.S. PATENT DOCUMENTS

| | | | |
|---|---|---|---|
| 2,930,083 | 3/1960 | Vostovich | 18/55 |
| 3,865,897 | 2/1975 | Falender et al. | 525/106 |
| 4,265,801 | 5/1981 | Moody | 260/40 R |
| 4,535,113 | 8/1985 | Foster | 524/262 |
| 4,616,064 | 10/1986 | Zulosky et al. | 525/92 |
| 4,666,772 | 5/1987 | Schinkel | 428/330 |
| 4,692,386 | 9/1987 | Schinkel | 428/515 |
| 4,857,593 | 8/1989 | Leung et al. | 525/92 |
| 5,034,278 | 7/1991 | Turbett | 428/450 |
| 5,120,888 | 6/1992 | Nohr et al. | 524/99 |
| 5,356,585 | 10/1994 | Romenesko | 264/211 |

FOREIGN PATENT DOCUMENTS

| | | |
|---|---|---|
| 1049682 | 2/1975 | Canada . |
| 3-203123 | 4/1991 | Japan . |
| 4-089850 | 3/1992 | Japan . |
| 5-098090 | 4/1993 | Japan . |
| 1062241A | 12/1987 | U.S.S.R. . |

*Primary Examiner*—Ralph H. Dean
*Attorney, Agent, or Firm*—Richard I. Gearheart

[57] ABSTRACT

There is disclosed a polyolefin composition which can be extruded at relatively high rates to provide extrudate having improved hydrophobicity, said composition comprising
(A) 100 parts by weight of a polythylene resin; and
(B) 1 to 5 parts by weight of an interactive diorganopolysiloxane process aid, said diorganopolysiloxane having a number average molecular weight of at least 10,000. In particularly preferred embodiments, an interactive diorganopolysiloxane in combination with a low density polyethylene is used as a process aid for linear low density polyethylene.

22 Claims, No Drawings

LOW DENSITY POLYETHYLENE MODIFIED WITH SILICONE MATERIALS

FIELD OF THE INVENTION

The present invention relates to polyethylene compositions having improved hydrophobicity wherein an interactive diorganopolysiloxane is added to a polyethylene resin.

SUMMARY OF THE INVENTION

It has now been found that, when a small quantity of an interactive diorganopolysiloxane is added to a low density polyethylene resin, considerably improved hydrophobicity is attained.

The present invention therefore relates to a composition comprising:
(A) 100 parts by weight of a low density polyethylene resin; and
(B) greater than 1 parts by weight of an interactive diorganopolysiloxane, said diorganopolysiloxane having a number average molecular weight of at least 40,000.

In particularly preferred embodiments, a linear low density polyethylene is modified with the hydroxy-functional diorganopolysiloxane. Such compositions exhibit a surprisingly improved hydrophobicity.

DETAILED DESCRIPTION OF THE INVENTION

Particularly preferred low density polyethylenes (A) are polymers such as low density polyethylene, (LDPE) and linear low density polyethylene, (LLDPE) made from substantially linear, ethylene homopolymers/interpolymers of ethylene with alpha-olefins having 3 to 10 carbon atoms. Preferably, these systems have a density of about 0.85 to 0.97 g/cc, more preferably 0.875 to 0.930 g/cc, and weight average molecular weight of about 60,000 to about 200,000. These polymers are well known in the art and further description thereof is considered unnecessary.

The diorganopolysiloxane (B) of the present invention is an interactive oil or ultra high molecular weight diorganosiloxane, having a number average molecular weight (Mn) of at least about 40,000, but preferably below about 1,000,000. Preferably, the Mn of component (B) is about 40,000 to about 450,000, more preferably about 75,000 to about 450,000.

It is contemplated that many of the compositions of the present invention will be processable in conventional extrusion equipment or injection molding equipment. When the compositions are to be extruded, the molecular weight of component (B) will influence the processing characteristics of the composition. When the molecular weight is below about 40,000 the compositions tend to exhibit excessive screw slip, i.e., lower output than expected for a given RPM of an extruder. Furthermore, at the lower molecular weights there is a marked decrease in extruder output when the compositions are extruded a second time. Such a second extrusion is often required in industrial operations. For example, errors in manufacture, such as incorrect extruder settings or omission of/insufficient amount of key ingredients, necessitate re-extrusion of the resulting "off-spec" material. Likewise, in film blowing operations, the edge portions of a flattened bubble are trimmed and recycled to the extruder. Further, re-extrusion is employed when scrap is returned and recycled, this procedure being known as "post-consumer recycle" in the art. On the other hand, when the molecular weight is above about 1,000,000, mixing the diorganopolysiloxane into the polyethylene becomes difficult but such a siloxane could still be employed.

Also critical to the practice of the present invention is the type of die used in the process of this invention. In order to practice the present invention it is necessary to extrude or inject the composition through a metal die. The most preferred die is stainless steel, although chromium, nickel and platinum dies can also be used. It is not required that the metal be solid chromium or platinum; the die may be plated. The use of a metal die is critical to obtaining the desired properties of the invention. The die attracts the interactive groups of the polydiorganosiloxane, causing the polydiorganosiloxane to migrate toward the die. As a result the polydiorganosiloxane collects and concentrates at the surface of the film, giving the film improved hydrophobic properties.

It is preferred that component (B) is a gum having Mn in the approximate range of 100,000 to about 1,000,000 and most preferably about 250,000 to about 350,000. Component (B) may be a linear or branched polymer or copolymer wherein the organic groups are independently selected from methyl or phenyl radicals.

Suitable diorganopolysiloxanes include polydimethylsiloxane homopolymers, copolymers consisting essentially of dimethylsiloxane units and methylphenylsiloxane units, copolymers consisting essentially of dimethylsiloxane units and diphenylsiloxane units, copolymers consisting essentially of diphenylsiloxane units and methylphenylsiloxane units, and homopolymers of methylphenylsiloxane units. Mixtures of two or more such polymers or copolymers may be employed as component (B).

For the purposes of the present invention the diorganopolysiloxane (B) must contain at least 1, but preferably 2 or more, interactive groups in the molecule, such as hydroxyl, carboxylic acid, nitrogen, alkylenyl groups. As used herein the term "interactive" refers to the tendency of the group to attracted to a metal surface, such as extrusion die. Most preferred are hydroxyl groups. The interactive groups may be located at the ends of the molecule, or they may be distributed along the chain or they may be located both at the ends as well as along the chain. Preferably, the interactive groups reside at the molecular chain ends, as in the case of hydroxyl, in the form of diorganohydroxysiloxy groups, such as dimethylhydroxysiloxy, diphenylhydroxysiloxy, and methylphenylhydroxysiloxy, inter alia. When the interactive groups are located only along the chain, the terminal groups of the diorganopolysiloxane may be any non-reactive moiety, typically a di or triorganosiloxy species such as dimethylvinylsiloxy or trimethylsiloxy.

It is preferred that the diorganopolysiloxane (B) is a linear polydimethylsiloxane containing up to about 50 mole percent of phenyl radicals. Most preferably, it is a polydimethylsiloxane homopolymer having dimethylhydroxysiloxy end groups.

The compositions of the present invention are prepared by thoroughly dispersing greater than 1 part by weight of diorganopolysiloxane (B) in 100 parts by weight of a low density polyethylene (A). For masterbatches, the composition can contain up to 50 parts by weight of component. For finished products, it is preferred that about 1 to about 5 parts by weight of component (B) is used for each 100 parts by weight of component (A). More preferably, about 1 to 4 parts of (B), and most preferably about 1 to 3 parts, per 100 parts by weight of (A) are used. When the diorganopolysiloxane is added at levels below about 1.0 part per 100 parts by weight of (A), there is little improvement in the contact angle versus the corresponding unmodified polyolefin, particularly at high rates of extrusion. Similarly, at levels higher than about 10 parts of (B) per 100 parts by weight of (A), the surface quality of the extrudate again begins to deteriorate. Furthermore, when more than about 10 parts of (B) per 100 parts by weight of (A) is used, an excessive amount of siloxane is observed on the surface of the extrudate which adversely impacts such properties as printability and sealability. Additionally, the physical properties of the final extrudate are degraded. Thus, the above recited preferred compositional ranges result in the desired balance of good contact and hydrophobicity as well as low screw slip during processing, particularly at high extruder output rates.

The dispersion of diorganopolysiloxane (B) into polyethylene (A) may be accomplished by any of the traditional means for mixing additives into thermoplastic resin at elevated temperature. For example, the two components may be blended in a twin-screw extruder, a Banbury mixer, a two-roll mill or a single-screw extruder, either with or without a mixing head. The equipment used to mix these component is thus not critical as long as a uniform dispersion of (B) in (A) is attained. Preferably the dispersed particle size is no larger than about 10 micrometers.

In addition to the above components, compositions of the present invention may also contain up to about 1 percent by weight of each of the following: fillers, cure agents, lubricants, u.v. stabilizers, antioxidants, antiblock agents, catalyst stabilizers and other process aids commonly employed in the modification of polyolefins. When more than about 1 weight percent of any of these additional ingredients is used, there is interference with the process aid of the present invention such that the above described benefits in processing and/or the character of the resulting extruded materials are not optimal. This is particularly critical in the case of blown film production, where good surface quality is crucial. Moreover, up to 15% by weight of the total composition of the present invention could be an antiblock agent.

Specific non-limiting examples of the above additional ingredients include the following substances. Diatomaceous earth, octadecyl-3-(3,5-di-5-butyl 4-hydroxyphenyl)-propionate, bis(2-hydroxyethyl) tallowamine, calcium stearate, N,N-bis(2,2,6,6-tetramethyl-4-piperidinyl)-1,6-hexanediamine polymer with 2,4,6-trichloro-1,3,5-trizaine and 2,4,6-trichloro- 1,3,5-trizaine and 2,4,4-trimethyl 1,2-pentanamine, dimethyl succinate polymer with 2,2,6,6-tetramethyl-1-piperridineethanol, 2,2-thiobis)4-tert-octylphenolato]n-butylamine nickel, tris(2,4-di-tert-butylphenyl)phoshite, bis(2,4-di-t-butylphenyl) pentaerythritol diphosphite, trisnonylphenylphospite, polyethylene glycol, Erucamide, titanium dioxide, titanium dioxide, alumina, hydrated alumina, talc, 2-hydroxy-4-n-octyloxy-benzophenone, silicone dioxide, zinc oxide, zinc sulfide and zinc stearate.

According to the method of the present invention, the above described diorganopolysiloxane (B) is added to the low density polyethylene resin (A) and serves as a process aid therefor when the resin is extruded at elevated temperatures to form a shaped product (e.g., a cylindrical cross-section, such as a film, ribbon, bar, annulus, fiber, sheet, or the like). The resulting extrudate has an improved hydrophobicity relative to a similar extrudate which does not contain diorganopolysiloxane (B). This method is particularly applicable to the production of cast film or blown film, but also finds utility in extrusion blow molding; injection molding; pipe, wire, or cable extrusion; fiber production; and any similar high shear melt processing of polyolefin resins, all of these techniques being well known in the art.

Briefly stated, blown film is typically produced by a "bubble" technique, wherein the polyolefin composition (i.e., the melt) is extruded through an annular die to form a film in the shape of a bubble. This bubble is withdrawn from the die at a rate greater than the rate of extrusion, while a positive air pressure is maintained within the bubble. Film produced in this manner is biaxially oriented as a result of stretching in the radial and axial directions and this orientation generally imparts improved mechanical properties to the film. Cast film is generally prepared by extruding the polyethylene through a slot die followed by cooling on one or more chill rolls. In the case where the composition is injection molded, the die must also be metal, or the mold into which the thermoplastic is injected is made of metal, such as stainless steel, or plated with chromium, nickel or platinum among others.

The compositions of the present invention can therefore be further subject to a further process step which are well known in the art, such as but not limited to injection molding, injection blow molding, extrusion blow molding, blown film processes, cast film processes, profile extrusion, rotational molding, compression molding, transfer molding, theromforming and calendering.

Although it is possible to obtain a relatively uniform dispersion by injecting component (B) into the screw section of an extruder while polyethylene pellets are fed in through the hopper thereof, it is preferred to first thoroughly disperse component (B) in a portion of component (A) to form a masterbatch. This masterbatch (or concentrate), which preferably contains about 1 to 50, more preferably 20 to 50, weight percent of the diorganopolysiloxane, may be ground up or pelletized, the resulting particulate dry-blended with additional polyethylene (the matrix) and this blend then extruded to form a composition of the invention. Use of this masterbatch technique results in a more uniform dispersion of the diorganopolysiloxane in the polyethylene matrix.

The polyethylene used in the preparation of the above described masterbatch may be the same as, or different from, the matrix polyethylene resin. Preferably, the two are of the same general type (e.g., the same polyethylene in the masterbatch and as the matrix). However, in highly preferred embodiments of the compositions and method of the present invention wherein the matrix polyethylene is a linear low density polyethylene (LLDPE), it has been found that the further addition of two-component systems of the invention.

Thus, highly preferred compositions of the invention comprise 100 parts by weight of a linear low density polyethylene, and from 1 to 10 parts by weight of diorganopolysiloxane. The composition may also include low density polyethylene. Whether LDPE is added to the composition of the present invention, however, depends on the how the composition will be processed. In the case where the film is blown, those skilled in the art will appreciate only 10% by weight of the thermoplastic resin component (A) composition can be LDPE, because amounts greater than 10% will cause difficulties during the film blowing process. If the resin is to be made into a cast film however, the same difficulties do not manifest, and therefor LDPE may constitute any amount of polyethylene component (A). When used in the blown process, below about 1 part of LDPE per 100 parts by weight of LLDPE the three-component composition can not generally be distinguished over the above described systems comprising only components (A) and (B). In these preferred embodiments where the film is blown, a favorable proportion is about 0.1 to 5 parts by weight of LDPE (C) for each 100 parts by weight of LLDPE (A), while the preferred diorganopolysiloxane (B) content is as described supra.

For the purposes of the present invention, the LDPE may be any of the highly branched PE homopolymers having a number average molecular weight up to about 4,000,000 and a density of about 0.915 to 0.925 g/cc.

The modified thermoplastic resins of the present invention show a variety of improved properties. For example it is believed by the inventor that the siloxane migrates to the surface of the thermoplastic. The migration of the polysiloxane to the surface of the thermoplastic gives the surface of the thermoplastic improved properties, such as improved hydrophobicity and pourability. Thus, films and shaped articles such as bottles or other containers made from the invention have better hydrophobicity and/or pourability.

Moreover, the congregation of silicone at the surface of the thermoplastic gives the thermoplastic an improved "hand". In addition, adding the polyorganosiloxane of the present invention also improves the process efficiency of the thermoplastic.

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 25° C., unless indicated to the contrary.

CONTACT ANGLE

Measurements

The contact angle between a drop of specified liquid and a specified substrate is determined using a goniometer which measures the angle of the tangency of the drop profile to the surface. The material tested may be either the liquid or the substrate. In the following examples, distilled water was used and the substrates varied by adding different siloxanes and differing amounts of siloxanes. The observed angle is reported in degrees along with the identity of both the liquid and substrate. This method is similar to ASTM D 724.

To make the measurements, the optical bench of the goniometer was leveled. The specified substrate was placed on the support stage and secured. The stage was adjusted so that the substrate or film could be clearly viewed through the microscope or video camera. A drop (2.5 mm in diameter) was placed on the substrate by making direct liquid to surface contact. The liquid was not dropped on the surface or otherwise distorted during placement. The illuminator was adjusted to optimum level and the microscope focused on the dark drop silhouette against a lighter background. The angle of tangency on both the left-hand and right-hand solid/liquid interface on the drop was measured and reported. The procedure was repeated three times and the average value reported to the nearest degree.

MATERIALS

The following materials were employed in the examples. LLDPE=a linear, low density polyethylene; an octene-based copolymer of ethylene having a density of 0.917 g/cc and marketed under the trade name DOWLEX™ 2045A by the Dow Chemical Co., Midland, Mich.

LDPE=a low density polyethylene having a density of 0.923 g/cc and marketed as DOW™ GP-LDPE 5004IM by the Dow Chemical Co.

EXAMPLE 1

Masterbatches of the below described siloxanes in the above described polyethylenes (PE) were prepared by thoroughly mixing these components with the polyethylenes at elevated temperature. The polyethylene was a 100% LDPE. Enough of the silicone was added to creat a masterbatch where the silicone was 25% by weight of the LLDPE.

Silicone A is an OH terminated polydimethylsiloxane having a molecular weight of about 400,000 and a viscosity of $2.5 \times 10^7$ cp.

Silicone B is an OH terminated polydimethylsiloxane having a molecular weight of about 65,000 and a viscosity of 60,000 cp.

Silicone C is an OH terminated polydimethylsiloxane having a molecular weight of about 38,000 and a viscosity of 10,000 cp.

Silicone D is a vinyl terminated polydimethylsiloxane having a molecular weight of about 400,000 and a viscosity of $2.5 \times 10^7$ cp.

The particular masterbatches (MB) were prepared on a Haake Rheocord™ 90 system twin-screw extruder (Haake—Paramus, N.J.), equipped with a Leistritz Micro 18 co-rotating twin screw extruder having a L/D (Length/Diameter) of 40/1 with the screw diameter of 18 mm. Temperatures of the eight zones of each chamber of the extruder were set 185° C., respectively. In each case, the masterbatch composition was extruded through a strand die and chopped into pellets upon cooling in a water bath.

The above masterbatches (MB) were employed as a process aid for polyethylene by thoroughly dispersing it in a LLDPE matrix. The amounts of pellets used were calculated so as to give a total silicone concentration of about 1% and 2.5% by weight of the thermoplastic resin for each of the four silicone resins used.

The mixtures above were compounded by thoroughly mixing the thermoplastic silicone pellets and the polyethylene at elevated temperature, on a Haake Rheocord™ 90 system twin-screw extruder (Haake—Paramus, N.J.), equipped with a Leistritz Micro 18 corotating twin screw extruder having a L/D (Length/Diameter) of 40/1 with the screw diameter of 18 mm. Temperatures of the eight zones of each chamber of the extruder were set at 185° C. In each case, the masterbatch composition was extruded through a strand die and chopped into pellets upon cooling in a water bath. The polyethylene was a 50/50 blend of LLDPE and LDPE.

After compounding in the twin screw extruder, the pellets were placed in a Blown Film Extruder (from Davis Standard) model KL-075 ¾ inch floor model extruder, L/D 24/1 having 3 heating zones at 220 ° C. A circular 2.5 inch diameter Stainless Steel die maintained at 220 ° C. was used to create the bubble. The air pressure inside the bubble was set so the blow up ratio was 2 thus creating a 5 inch "lay flat" tube of film. The air ring used room air to blow around the bubble to cool and crystallize the film. The collapsing gate and pinch roll system allowed the film to be collected. Samples were taken to measure the contact angle.

The following Table 1 shows that the selected silicones improved the contact angle of the substrate, indicating a higher level of hydrophobicity than the standard control for unmodified polyethylene.

TABLE 1

| Sample | Percent Silicone in Polyethylene | Water Contact Angle, degrees |
| --- | --- | --- |
| Sample 10567-123-1 | Virgin PE, 50% 5004 IM LDPE, 50% 2045 LLDPE | 100 |
| Silicone A | 1% | 100 |

TABLE 1-continued

| Sample | Percent Silicone in Polyethylene | Water Contact Angle, degrees |
|---|---|---|
| Silicone A | 2.5% | 111 |
| Silicone B | 1% | 102 |
| Silicone B | 2.5% | 108 |
| Silicone C | 1% | 101 |
| Silicone C | 2.5% | 103 |
| Silicone D | 1% | 102 |
| Silicone D | 2.5% | 103 |

As can be seen above, addition of the functional terminated siloxane to LDPE improves the hydrophobicity from 1 to 10%.

That which is claimed is:

1. A composition comprising:
   (A) 100 parts by weight of a low density polyethylene resin; and
   (B) 1 to 5 parts by weight of an interactive diorganopolysiloxane having a number average molecular weight of at least 40,000 wherein said interactive diorganopolysiloxane has at least one pendant or terminal interactive group selected from the group consisting of hydroxyl groups, amine groups, and vinyl groups.

2. The composition according to claim 1, wherein said diorganopolysiloxane (B) is a linear hydroxy-terminated polydimethylsiloxane, and said thermoplastic resin (A) is a linear, low density polyethylene resin.

3. The composition according to claim 1, wherein the number average molecular weight of said polydimethylsiloxane (B) is 100,000 to 1,000,000.

4. The composition according to claim 1, wherein the number average molecular weight of said polydimethylsiloxane (B) is 40,000 to 450,000.

5. Shaped products of the composition according to claim 1.

6. Shaped products of the composition according to claim 2.

7. A composition comprising:
   (A) 100 parts by weight of a linear low density polyethylene resin;
   (B) 1 to 5 parts by weight of an interactive diorganopolysiloxane having a number average molecular weight of at least 10,000 wherein said interactive diorganopolysiloxane has at least one pendant or terminal interactive group selected from the group consisting of hydroxyl groups, amine groups, and vinyl groups; and
   (C) 0.01 to 100 parts by weight of a low density polyethylene.

8. The composition according to claim 7, wherein the number average molecular weight of said polydimethylsiloxane (B) is 100,000 to 1,000,000 and from 1 to 5 parts by weight of said polydimethylsiloxane is used for each 100 parts by weight of said polyethylene resin (A).

9. The composition according to claim 7, wherein the number average molecular weight of said polydimethylsiloxane (B) is 250,000 to 350,000 and from 1 to 5 parts by weight of said polydimethylsiloxane is used for each 100 parts by weight of said polyethylene resin (A).

10. Shaped products of the composition according to claim 7.

11. Shaped products of the composition according to claim 8.

12. In a method of processing a polyethylene resin in which a process aid is added to the polyethylene resin to facilitate processing thereof, the improvement comprising adding as the process aid 1 to 5 parts by weight of an interactive diorganopolysiloxane having a number average molecular weight of at least 40,000, wherein said interactive diorganopolysiloxane has at least one pendant or terminal interactive group selected from the group consisting of hydroxyl groups, amine groups, and vinyl groups, and processing the resin through a metal die, whereby the resulting polyethylene resin exhibits an improved degree of hydrophobicity relative to the unmodified polyethylene resin.

13. The method according to claim 12, wherein said diorganopolysiloxane is a linear hydroxy-terminated polydimethylsiloxane and said polyethylene resin is linear low density polyethylene.

14. The method according to claim 12, wherein the number average molecular weight of said polydimethylsiloxane is 100,000 to 400,000 and from 1 to 5 parts by weight of said polydimethylsiloxane is used for each 100 parts by weight of said polyethylene.

15. The method according to claim 12, wherein the resulting processed thermoplastic resin is subjected to a film blowing step.

16. The method according to claim 12, wherein the resulting processed thermoplastic resin is subjected to a cast film step.

17. In a method of processing a thermoplastic resin in which a process aid is added to the thermoplastic resin, the improvement comprising adding a process aid which is a uniform blend of
   (i) an interactive diorganopolysiloxane having a number average molecular weight of at least 40,000 wherein said interactive diorganopolysiloxane has at least one pendant or terminal interactive group selected from the group consisting of hydroxyl groups, amine groups, and vinyl groups,; and
   (ii) a linear low density polyethylene to
   (iii) a linear low density polyethylene resin, whereby the resulting processed polyethylene resin is processed through a metal die, and the processed resin exhibits improved hydrophobicity relative to the unmodified thermoplastic resin, and said processed resin has a total of 1 to 5 parts by weight of the interactive diorganopolysiloxane.

18. The method according to claim 17, wherein said diorganopolysiloxane is a linear hydroxyl-terminated polydimethylsiloxane.

19. The method according to claim 17, wherein the number average molecular weight of said polydimethylsiloxane is 100,000 to 400,000, from 1 to 5 parts by weight of said polydimethylsiloxane is used for each 100 parts by weight of said thermoplastic resin and from 0.01 to 10 parts by weight of said low density polyethylene is used for each 100 parts by weight of said linear low density polyethylene.

20. The method according to claim 17, wherein the resulting processed thermoplastic resin is injection molded.

21. The method according to claim 17, wherein the resulting processed thermoplastic resin is subjected to a further process step selected from the group consisting of injection molding, injection blow molding, extrusion blow molding, blown film processes, cast film processes, profile extrusion, rotational molding, compression molding, transfer molding, theromforming and calendering.

22. The method according to claim 17, wherein the resulting processed thermoplastic resin is subjected to a cast film step.

* * * * *